United States Patent
Vigier

(10) Patent No.: US 7,568,958 B2
(45) Date of Patent: Aug. 4, 2009

(54) ELECTRICAL TERMINAL FOR SEALED ACCUMULATOR

(75) Inventor: Nicolas Vigier, Jaunay-Clan (FR)

(73) Assignee: Saft Groupe SA, Bagnolet (FR)

( * ) Notice: Subject to any disclaimer, the term of this patent is extended or adjusted under 35 U.S.C. 154(b) by 0 days.

(21) Appl. No.: 12/042,011

(22) Filed: Mar. 4, 2008

(65) Prior Publication Data

US 2008/0220667 A1    Sep. 11, 2008

(30) Foreign Application Priority Data

Mar. 9, 2007  (FR)  ................... 07 01729

(51) Int. Cl.
  *H01R 4/02*  (2006.01)
(52) U.S. Cl. .................. 439/876; 174/50.52
(58) Field of Classification Search ........... 439/876, 439/890, 83; 174/59, 60, 169, 176
  See application file for complete search history.

(56) References Cited

U.S. PATENT DOCUMENTS

| | | | | |
|---|---|---|---|---|
| 2,800,711 A | * | 7/1957 | Oliphant et al. | 228/221 |
| 3,539,580 A | * | 11/1970 | Hermans et al. | 546/217 |
| 4,054,901 A | * | 10/1977 | Edwards et al. | 257/718 |
| 4,625,260 A | * | 11/1986 | Jordan et al. | 361/720 |
| 4,924,176 A | * | 5/1990 | Tremblay | 324/133 |
| 5,620,086 A | * | 4/1997 | Bianca et al. | 200/542 |
| 5,637,404 A | * | 6/1997 | Bombalski et al. | 428/422 |
| 5,930,114 A | * | 7/1999 | Kuzmin et al. | 361/704 |
| 6,322,921 B1 | * | 11/2001 | Iwaizono et al. | 429/56 |
| 6,620,544 B1 | * | 9/2003 | Shin et al. | 429/56 |
| 6,707,676 B1 | * | 3/2004 | Geva et al. | 361/719 |
| 6,942,500 B2 | * | 9/2005 | Chen | 439/83 |
| 7,205,746 B2 | * | 4/2007 | Batson | 320/107 |
| 2003/0113622 A1 | * | 6/2003 | Blasi et al. | 429/199 |
| 2004/0237302 A1 | * | 12/2004 | Antaya et al. | 29/874 |
| 2005/0277017 A1 | * | 12/2005 | Cho | 429/56 |
| 2006/0051666 A1 | * | 3/2006 | Kim | 429/184 |
| 2006/0199046 A1 | * | 9/2006 | Dewulf et al. | 429/7 |

FOREIGN PATENT DOCUMENTS

EP    0 457 569 A2    11/1991
FR    2 748 608 A1    11/1997

* cited by examiner

*Primary Examiner*—Hae Moon Hyeon
*Assistant Examiner*—Harshad C Patel
(74) *Attorney, Agent, or Firm*—Sughrue Mion, PLLC

(57) ABSTRACT

A terminal for a sealed accumulator includes a single-piece body made of aluminium with at least one tinned zone for soldering to an electronic card and at least one non-tinned zone for connection to a current output terminal of the accumulator. The electrical terminal has a limited space requirement; welds well onto an accumulator container made of aluminium and allows easy assembly with an electronic card by soldering without risk of migration of tin which could cause a short circuit.

15 Claims, 2 Drawing Sheets

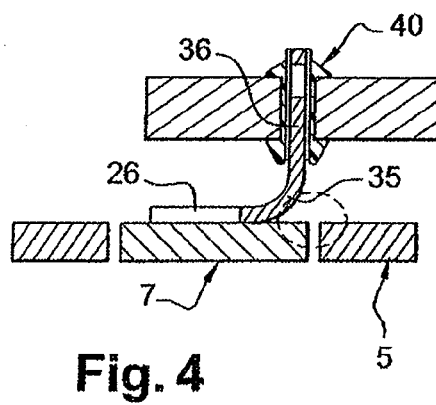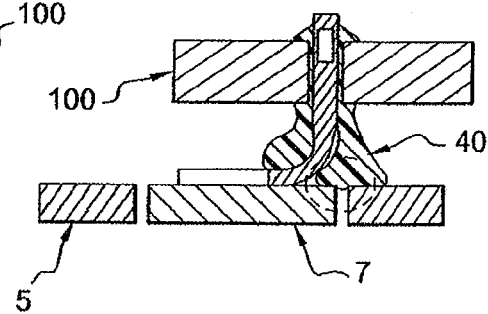
Fig. 4          Fig. 5
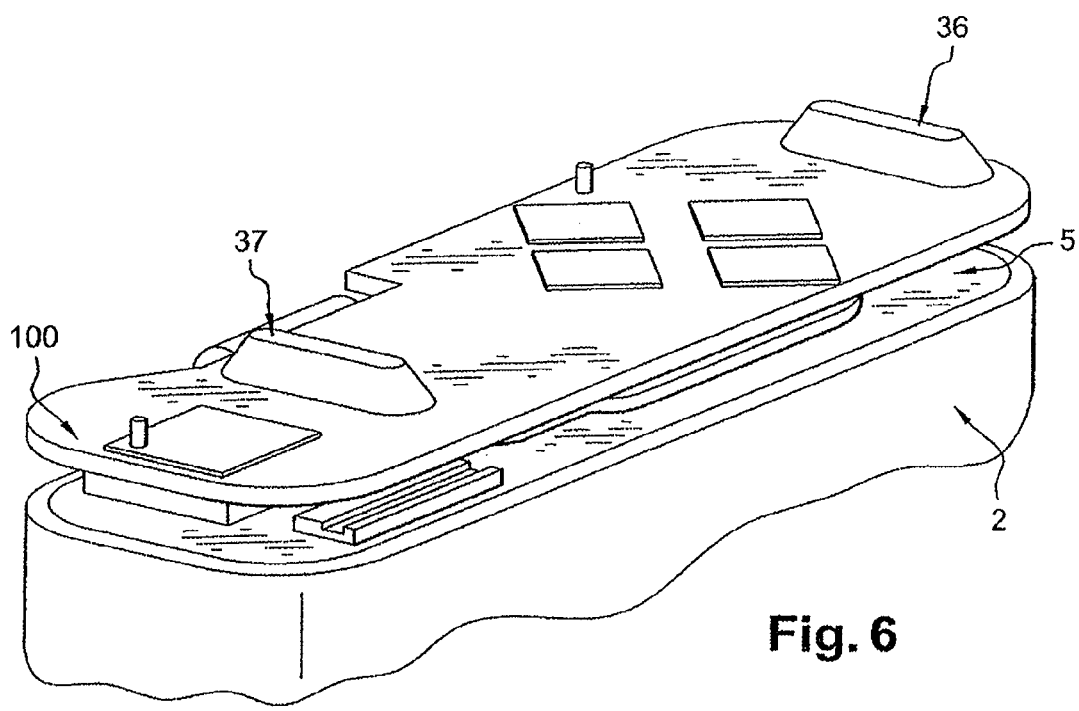
Fig. 6

ELECTRICAL TERMINAL FOR SEALED ACCUMULATOR

BACKGROUND OF THE INVENTION

The present invention relates to an electrical terminal for a sealed accumulator.

The invention relates to any type of sealed accumulator, in particular accumulators of the nickel-cadmium, nickel-metal hydride and lithium-ion type. These accumulators can be of a cylindrical format, a rectangular format (also known as prismatic) or semi-prismatic (oblong shape)

A sealed accumulator or sealed electrochemical generator (as these two terms are equivalent, the term accumulator will be used in this description) comprises, in a manner known per se, an electrochemical bundle comprising alternating positive and negative electrodes framing separators impregnated with electrolyte; this electrochemical bundle constitutes the core of the accumulator. Typically, each electrode is made up of a metal current collector, also called a strip, supporting the electrochemically active material on at least one of its faces. Each electrode is electrically connected to a current output which ensures electrical continuity between the electrode and the external application with which the accumulator is associated. The bundle of electrodes is arranged in a container which is sealed tight by a cover; the cover can support current output terminals of both polarities. A first current output terminal, for example the positive terminal, is generally welded onto the cover. A second current output terminal, for example the negative terminal, passes through the cover; it is generally fixed to the latter by crimping and seals electrically insulate the negative current output terminal from the cover. Electrical terminals are then connected to the current output terminals for connection to an external application; an electronic card is also typically connected to the electrical terminals of the accumulator in order to control the operation of the accumulator.

Various solutions exist in the state of the art for connecting electrical terminals to the positive and negative output terminals of the accumulator and to an electronic card.

For example, the electrical terminals can be made of nickel or nickel-plated steel; they are electrically welded onto the accumulator, by laser or ultrasound, and soldered onto an electronic card. This is for example the case with the accumulators sold by the Applicant company under the reference MP176065HD in particular (nickel terminal electrically welded onto the accumulator and soldered onto the electronic card). Nickel is however a high-resistivity material; the terminals therefore have to be bulky in order to allow the passage of high currents, in particular for high-power applications (telecom, automobile). Such terminals therefore occupy a significant amount of space, are heavy and a long time is needed for soldering onto the electronic card as the terminals take time to heat up. Moreover, soldering a nickel terminal to an electronic card can cause tin to run along the terminal and cause a short circuit between the current output terminal to which the terminal is welded and the other polarity. This phenomenon will be explained more in detail with reference to FIG. 5 by comparison with the invention.

The nickel terminals can also be designed to be screwed or electrically welded onto an electronic card.

Copper terminals also exist, but copper is more difficult to laser-weld to the accumulator and welds very poorly by electric welding. Moreover, the soldering of a copper terminal to an electronic card can also cause tin to run as in the case of a nickel terminal.

Moreover, for reasons of weight and raw material costs, it is sought to produce accumulator containers from aluminium rather than stainless steel. Aluminium has better thermal dissipation and better electrical conductivity; it is also lighter and less expensive per unit of weight than stainless steel.

However, nickel terminals weld poorly to an aluminium container because of the great thickness of nickel to be used for conducting the power; the laser weld is then "brittle". It would then be possible to use electrical terminals of aluminium, which would weld well to the aluminium container; but such terminals cannot be electrically welded onto the electronic card as aluminium is too good an electrical conductor which interferes with the welding. These aluminium electrical terminals can also not be soldered onto the electronic card as such, because tin and aluminium repel each other.

For example, the Lithium-ion accumulators sold by the Applicant company under the reference VL7P have screw terminals for connection to each other and/or for connection to an electronic card. They are made of aluminium 1050 in the case of the positive terminal (laser-welded onto the aluminium case) and nickel-plated copper in the case of the negative terminal (crimped onto the case).

Soldering the electrical terminals to the electronic card is advantageous for use on an industrial scale as the stability of the electric contact is ensured over time.

A need therefore exists for electrical accumulator terminals with a reduced space requirement, which can be easily welded onto the current output terminals and which can be soldered onto an electronic card without risk of a short circuit.

SUMMARY OF THE INVENTION

For this purpose, the invention proposes to use an aluminium terminal with a zone which has received a tinning-type surface treatment in order to allow soldering onto an electronic card.

The invention relates more particularly to an electrical terminal for a sealed accumulator comprising a single-piece body made of aluminium with at least one tinned zone for soldering onto an electronic card and at least one non-tinned zone for connection to a current output terminal of the accumulator.

According to an embodiment, the terminal comprises a bent zone, the tinned zone extending substantially at 90° from a non-tinned zone. According to an embodiment, the bent zone is not tinned.

According to an embodiment, the tinned zone extends over each face of the single-piece body.

According to an embodiment, the tinned zone has an aperture allowing a passage of tin on both sides of the single-piece body during the soldering.

According to an embodiment, the tinned zone has a shoulder suitable for receiving and supporting the electronic card.

According to an embodiment, the non-tinned zone integrates a circuit breaker element. According to an embodiment, the non-tinned zone comprises a connection to an intermediate terminal of the accumulator, a connection to a current output terminal of the accumulator, a connection piece extending between the intermediate terminal and the current output terminal, and at least one weak point of the connection piece.

The invention also relates to a sealed accumulator comprising:

a container comprising positive and negative current output terminals, a first electrical terminal according to the invention, a zone made of aluminium being electrically connected to a current output terminal of a first polarity, a second electrical terminal according to the invention, a zone made of aluminium being electrically connected to a current output terminal of a second polarity, an electronic card soldered onto the tinned zone of the first electrical terminal and onto the tinned zone of the second electrical terminal.

According to an embodiment, the container is made of aluminium.

According to an embodiment, the aluminium zone of at least one terminal is welded onto a current output terminal.

The invention also relates to a method for assembly of an electronic card with a sealed accumulator according to the invention, comprising the stages of:

electrically connecting the aluminium zone of the first terminal to a current output terminal of a first polarity, electrically connecting the aluminium zone of the second terminal to a current output terminal of a second polarity, soldering the electronic card to the tinned zone of the first electrical terminal and to the tinned zone of the second electrical terminal.

According to an embodiment, at least one of the stages of electrically connecting the aluminium zone to the current output terminal is made by laser welding.

BRIEF DESCRIPTION OF THE DRAWINGS

Other characteristics and advantages of the invention will become apparent on reading the description which follows, given by way of example and with reference to the attached figures which show:

FIG. 4, a diagrammatic view of a detail of a terminal according to the invention welded onto the terminal of an accumulator;

FIG. 5, a diagrammatic view of a detail of a terminal according to the prior art welded onto the terminal of an accumulator;

FIG. 6, a perspective view of an electronic card soldered onto the terminals of an accumulator according to the invention.

DETAILED DESCRIPTION OF THE INVENTION

The invention relates to electrical terminals for a sealed accumulator.

According to the invention, an electrical terminal comprises a single-piece body made of aluminium. It is thus possible to produce terminals which have smaller dimensions and are lighter compared with nickel terminals. In fact, aluminium has very good electrical conductivity—approximately three times that of nickel—and allows high currents to pass through a small section.

The terminal according to the invention has a tinned zone, which allows effective soldering onto an electronic card, and a non-tinned zone, i.e. made of pure aluminium so that the terminal can be effectively connected to a current output terminal and in particular be laser-welded onto a container made of aluminium.

Within the framework of the invention, a distinction is made between soldering and welding. Soldering involves assembling metal pieces using a filler alloy in the liquid state, generally tin, which has a melting point below that of the pieces which it is desired to join, generally comprised between 280° C. and 310° C. During soldering, the pieces to be assembled do not fuse together to form the joint between the pieces. Soldering is in particular used when the quantity of metallic material on one of the pieces to be assembled is limited, which is the case with an electronic card. By contrast, welding involves assembling two pieces by melting their edges; the pieces to be assembled therefore fuse together to form the joint, the quantity of metallic material must therefore be adequate.

The invention will now be described with reference to a first embodiment illustrated in FIG. 1. The electrical terminal of FIG. 1 is particularly suitable for a connection to the container forming the positive terminal of the accumulator; but it is understood that the terminal illustrated in this FIG. 1 could also be connected to an output terminal of positive or negative current passing through the container of the accumulator.

Figure 1:
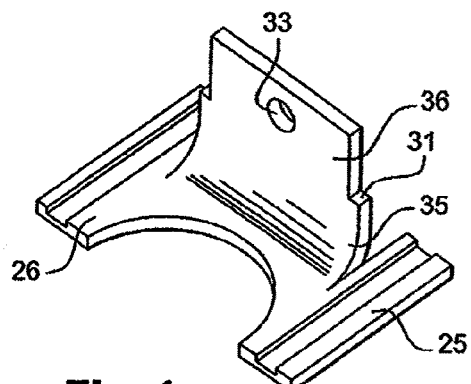
FIG. 1, a perspective view of an electrical terminal according to an embodiment of the invention.

The electrical terminal of FIG. 1 comprises a single-piece body substantially bent at 90°. At least one zone of the single-piece body is tinned 36 and at least one other zone of the single-piece body is made of pure aluminium 26, for example aluminium 1050. The single-piece body can be delivered to the accumulator manufacturer with the bent shape and with the surface treatment forming the tinned zone. The tinned zone 36 can be constituted by a tin-type surface coating with a thickness of 10 µm for a single-piece body with a thickness of approximately 0.6 mm.

The aluminium zone 26 (i.e. a zone not tinned) is intended to be electrically connected to a current output terminal of an accumulator. For example, strips 25 can extend on each edge of the aluminium zone 26. These strips 25, made of pure aluminium, serve as a line for welding the terminal to the cover of the accumulator container if the latter is made of aluminium. It is also possible to envisage the laser welding of an aluminium terminal according to the invention to an accumulator container made of stainless steel or nickel-plated steel.

The tinned zone 36 extends substantially at 90° from the aluminium zone 26 intended to be welded onto the current output terminal of the accumulator. The bent zone 35 forms part of the pure aluminium zone, i.e. is not tinned. The bent zone 35 thus constitutes a soldering stop zone as explained with reference to FIGS. 4 and 5.

The tinned zone 36 is situated on each face of the single-piece body and an aperture 33 allows a passage of tin on both sides of the single-piece body during soldering. An electronic card can thus be attached onto the tinned zone and electrically connected to the terminal by soldering as explained with reference to FIG. 4. FIG. 1 also shows a shoulder 31 on the tinned zone 36. This shoulder 31 makes it possible to receive and support the electronic card before the soldering operation.

Figure 2:
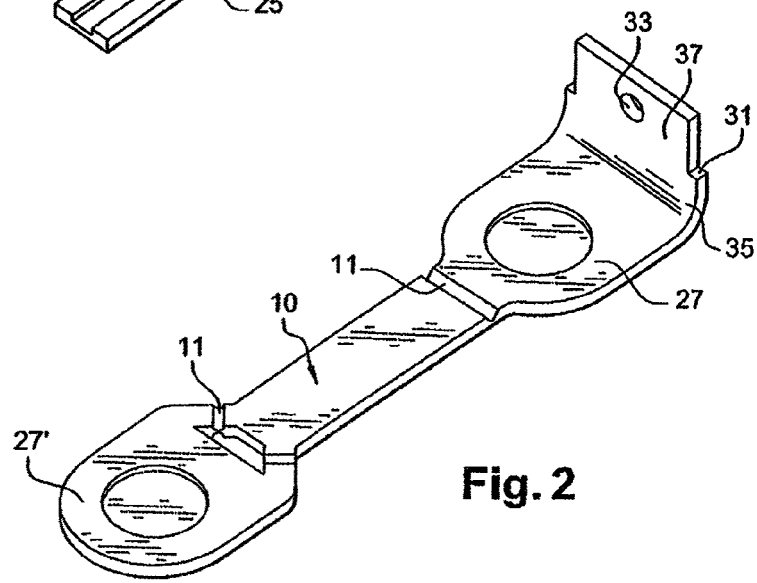
FIG. 2, a perspective view of an electrical terminal according to another embodiment of the invention.

FIG. 2 illustrates another embodiment of an electrical terminal according to the invention. The terminal of FIG. 2 is particularly suitable for a connection to the internal/external negative terminal of the accumulator, the terminal of FIG. 2 has an integral circuit breaker.

As in FIG. 1, the electrical terminal of FIG. 2 comprises a single-piece bent body with a tinned zone 37 and a pure aluminium zone 27; the tinned zone 37 extends substantially at 90° from the aluminium zone 27 intended to be welded onto a current output terminal of the accumulator and the bent zone 35 also forms part of the pure aluminium zone, i.e. is not tinned. As in FIG. 1, an aperture 33 is provided in the tinned zone 37 for a passage of tin on each side of the single-piece body during soldering and a shoulder 31 makes it possible to receive and support the electronic card before the soldering operation.

FIG. 2 also shows an element with a circuit breaker integrated into the single-piece body in the pure aluminium zone, i.e. in the zone connected to the current output terminal of the accumulator.

In fact, an accumulator is generally designed to operate under so-called nominal conditions, i.e. within given temperature, current and pressure ranges. The use of a sealed accumulator outside nominal conditions, such as for example an accidental overload, a short circuit, a temperature greater than the maximum operating temperature, etc. creates a risk of explosion.

Safety devices do exist. For example, from the document EP-A-1 705 735 a safety device for a sealed accumulator is known, comprising a connection piece extending above the cover of the container and suitable for conducting an electric current between an electrode of one polarity and its current output terminal and a membrane electrically insulated from the connection piece and suitable for being deformed under the effect of an excessive pressure in the container, the deformation of the membrane being suitable for breaking the connection piece.

Figure 3:
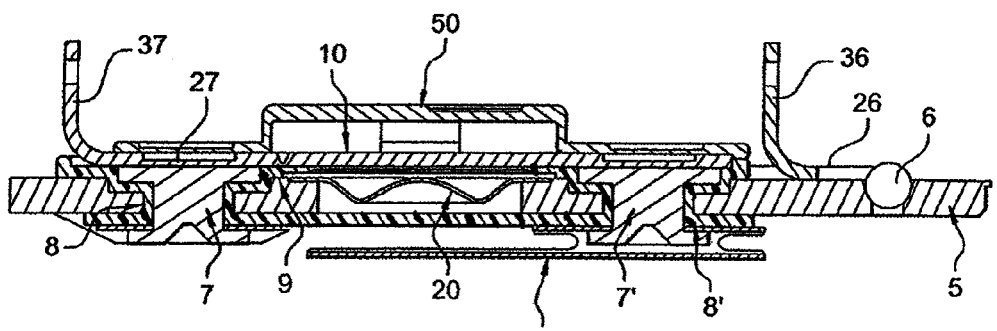
FIG. 3, a cross-section of the terminals according to the invention welded onto the terminals of an accumulator.

FIG. 3 shows in longitudinal cross-section the top of a sealed prismatic lithium-ion accumulator equipped with such a safety device and its two tinned aluminium terminals.

The accumulator of FIG. 3 comprises a container with a cover 5 which supports the output current terminals 6 and 7. The positive terminal 6 is welded onto the cover and the negative terminal 7 passes through the cover. A seal 8 electrically insulates the negative current output terminal 7 from the cover. An intermediate terminal 7' is provided with an electrical insulation seal 8'. A circuit breaker device is arranged between the intermediate terminal 7' and the negative current output terminal 7.

The circuit breaker comprises an electrically conductive connection piece 10 and a membrane 20 suitable for being deformed and breaking the connection piece 10 in order to interrupt the passage of the current in an irreversible manner. An insulating layer 9 is provided between the membrane 20 and the connection piece 10.

According to the invention, the electrical terminal of FIG. 2 can integrate the connection piece 10 of the circuit breaker element of the safety device of the accumulator. The connection piece 10 has the general shape of a rigid rectangular plate connecting a connection zone 27 intended to be connected to the negative current output terminal and a connection zone 27' intended to be connected to the intermediate terminal passing through the cover of the container. These connection zones 27, 27' can be fixed to the terminals 7, 7' by riveting or laser welding. The connection piece 10 is formed in the aluminium zone of the terminal according to the invention; it has two weak points 11 which allow the connection piece to break under the force of the deformed membrane 20. The aluminium has mechanical characteristics which promote a clean break under the pressure effect of the membrane 20. In order to prevent any risk of deterioration of the circuit breaker, a protection cap 50 can cover the connection piece, in particular the weak points 11.

The electrical terminal according to the invention, whether this is the embodiment of FIG. 1 or of FIG. 2 with circuit breaker, is soldered to an electronic card. The two electrical terminals are of substantially identical thickness in order to be soldered with the same parameters. FIG. 4 diagrammatically illustrates the soldering of the electrical terminal according to the invention to an electronic card and FIG. 5 diagrammatically illustrates the soldering of a nickel or copper electrical terminal to an electronic card. FIG. 5 is not according to the invention. FIGS. 4 and 5 thus show the cover 5 of the container of the accumulator—with positive polarity for example—and an internal/external current output terminal 7—with negative polarity for example. FIGS. 4 and 5 also show an electronic card 100 and the tin solder 40 constituting the metal supplied for the soldering operation.

The terminal according to the invention (FIG. 4) has an aluminium zone 26 connected to the current output terminal 7, by welding or riveting for example, and a tinned zone 36 extending substantially perpendicular to the plane of the cover 5 and of the card 100. The solder 40 is introduced at the tinned zone 36 of the terminal and spreads out on each side of the single-piece body through the aperture 33. The solder 40 does not however flow towards the cover 5 because the bent zone 35 constitutes a soldering stop zone. In fact, the bent zone 35 is made of aluminium and aluminium is repellent to tin. The risks of a short circuit between the terminals of opposite polarities with the solder 40 are thus reduced. In fact in FIG. 5 it can be seen that if the terminal is made of nickel or copper or any other material which does not repel tin, the solder 40 can flow along the branch of the terminal which is soldered to the card 100 and produce a short circuit with the cover 5 of the opposite polarity.

The invention thus makes it possible to assemble an electronic card 100 with an accumulator by soldering the card above the cover 5 of the container 2 as illustrated in FIG. 6. A simple and reliable assembly can be produced. In particular, the aluminium zone of a first terminal is electrically connected to a current output terminal of a first polarity, the aluminium zone of the second terminal is electrically connected to the current output terminal of the other polarity, and the electronic card is snapped in then soldered onto the tinned zones of the first and second electrical terminals. Moreover, if the accumulator container 2 is made of aluminium, for the reasons of cost and of weight mentioned previously, the electrical terminal connected to the cover 5 of the container can be welded easily and effectively.

The embodiments described in detail above and the figures must be considered as having been presented as illustrations and not restrictively; the invention is not intended to be limited to the details provided here but can be modified while remaining within the scope of the attached claims. In particular, the forms and dimensions of the electrical terminal can vary in relation to what is represented in the figures without the scope of the invention being exceeded.

The invention claimed is:

1. An electrical terminal for a sealed accumulator comprising a single-piece body made of pure aluminium with at least one tinned zone for soldering onto an electronic card and at least one non-tinned zone for welding to a current output terminal of the accumulator.

2. The electrical terminal according to claim 1, comprising a bent zone, the tinned zone extending substantially at 90° from a non-tinned zone.

3. The electrical terminal according to claim 2, wherein the bent zone is not tinned.

4. The electrical terminal according to claim 1, wherein the tinned zone extends over both sides of the single-piece body.

5. The electrical terminal according to claim 4, wherein the tinned zone has an aperture allowing a passage of tin on both sides of the single-piece body during soldering.

6. The electrical terminal according to claim 1, wherein the tinned zone has a shoulder suitable for receiving and supporting the electronic card.

7. The electrical terminal according to claim 1, wherein the non-tinned zone has an integral circuit breaker element.

8. The electrical terminal according to claim 7, wherein the non-tinned zone comprises:
- a connection to an intermediate terminal of the accumulator,
- a connection to a current output terminal of the accumulator,
- a connection piece extending between the intermediate terminal and the current output terminal,
- at least one weak point formed on the connection piece.

9. A sealed accumulator comprising:
- a container comprising positive and negative current output terminals,
- a first electrical terminal comprising a single-piece body made of aluminium with at least one tinned zone and at least one non-tinned zone, said non-tinned zone being electrically connected to a current output terminal of a first polarity,
- a second electrical terminal comprising a single-piece body made of aluminium with at least one tinned zone and at least one non-tinned zone, said non-tinned zone being electrically connected to a current output terminal of a second polarity,
- an electronic card soldered onto the tinned zone of the first electrical terminal and onto the tinned zone of the second electrical terminal.

10. The sealed accumulator according to claim 9, wherein the container is made of aluminium.

11. The sealed accumulator according to claim 9, wherein the aluminium zone of at least one terminal is welded onto a current output terminal.

12. The sealed accumulator according to claim 9, wherein the tinned zone of first electrical terminal has a first shoulder and the tinned zone of second electrical terminal has a second shoulder, the electronic card being soldered onto said first and second shoulders.

13. The sealed accumulator according to claim 9, wherein the non-tinned zone of second terminal comprises:
- a connection to an intermediate terminal of the accumulator,
- a connection to a current output terminal of the accumulator,
- a connection piece extending between the intermediate terminal and the current output terminal,
- at least one weak point formed on the connection piece.

14. A method for assembling an electronic card with a sealed accumulator comprising:
- a container comprising positive and negative current output terminals,
- a first electrical terminal comprising a single-piece body made of aluminium with at least one tinned zone,
- a second electrical terminal comprising a single-piece body made of aluminium with at least one tinned zone and at least one non-tinned zone, comprising the stages of:
- electrically connecting the aluminium non-tinned zone of the first terminal to a current output terminal of a first polarity,
- electrically connecting the aluminium non-tinned zone of the second terminal to a current output terminal of a second polarity,
- soldering the electronic card to the tinned zone of the first electrical terminal and to the tinned zone of the second electrical terminal.

15. The method according to claim 14, wherein at least one of the stages of electrically connecting the aluminium zone to the current output terminal is made by laser welding.

* * * * *